(12) United States Patent
Zhao et al.

(10) Patent No.: US 12,440,145 B2
(45) Date of Patent: Oct. 14, 2025

(54) DEVICE FOR DETERMINING MUSCLE STATE BASED ON ELECTROMYOGRAPHY SIGNAL AND MUSCLE OXYGEN SATURATION

(71) Applicant: KINGFAR INTERNATIONAL INC., Beijing (CN)

(72) Inventors: Qichao Zhao, Beijing (CN); Ran Yang, Beijing (CN); Zhao Li, Beijing (CN)

(73) Assignee: KINGFAR INTERNATIONAL INC., Beijing (CN)

( * ) Notice: Subject to any disclaimer, the term of this patent is extended or adjusted under 35 U.S.C. 154(b) by 418 days.

(21) Appl. No.: 18/086,726

(22) Filed: Dec. 22, 2022

(65) Prior Publication Data

US 2023/0210439 A1 Jul. 6, 2023

Related U.S. Application Data

(63) Continuation of application No. PCT/CN2022/096641, filed on Jun. 1, 2022.

(30) Foreign Application Priority Data

Dec. 31, 2021 (CN) .......................... 202111667416.5

(51) Int. Cl.
*A61B 5/397* (2021.01)
*A61B 5/1455* (2006.01)
*A61B 5/313* (2021.01)

(52) U.S. Cl.
CPC .......... *A61B 5/397* (2021.01); *A61B 5/14551* (2013.01); *A61B 5/313* (2021.01)

(58) Field of Classification Search
CPC ..... A61B 5/397; A61B 5/14551; A61B 5/313; A61B 5/14552; A61B 5/4519; A61B 5/389; A61B 5/14542
See application file for complete search history.

(56) References Cited

U.S. PATENT DOCUMENTS

2008/0097173 A1 4/2008 Soyemi et al.
2010/0105998 A1* 4/2010 Benni .................. A61B 5/6865
600/340
(Continued)

FOREIGN PATENT DOCUMENTS

CN 109077725 A 12/2018
CN 109222969 A 1/2019
(Continued)

OTHER PUBLICATIONS

Sheng, X., Ding, X., Guo, W., Hua, L., Wang, M., & Zhu, X. (2021). Toward an integrated multi-modal SEMG/MMG/NIRS sensing system for human-machine interface robust to muscular fatigue. IEEE Sensors Journal, 21(3), 3702-3712. https://doi.org/10.1109 jsen.2020.3023742 (Year: 2021).*

(Continued)

*Primary Examiner* — Paula J Stice
(74) *Attorney, Agent, or Firm* — Cooper Legal Group, LLC

(57) ABSTRACT

The embodiments of the present disclosure provides a device for determining muscle state based on electromyography signal and muscle oxygen saturation. The devices includes: a signal collection module, configured for collecting a human electromyography signal data; a light source detection module, configured for emitting light with different wavelengths; a photosensitive receiver module, configured for receiving light reflected by skin after the light emitted by the light source detection module irradiates the skin; a blood oxygen calculation module, configured for calculating the muscle oxygen saturation based on the light received by the photosensitive receiver module; and a data statistics module, configured for determining the muscle state based on the human electromyography signal data and (Continued)

the muscle oxygen saturation. In this way, an accurate detection of muscle state is realized.

5 Claims, 4 Drawing Sheets

(56) References Cited

U.S. PATENT DOCUMENTS

| | | | |
|---|---|---|---|
| 2011/0205535 | A1 | 8/2011 | Soller et al. |
| 2019/0366146 | A1* | 12/2019 | Tong ............... A61B 5/389 |
| 2020/0261023 | A1* | 8/2020 | Werbin ............. A61B 5/01 |

FOREIGN PATENT DOCUMENTS

| | | |
|---|---|---|
| CN | 109259762 A | 1/2019 |
| CN | 109688905 A | 4/2019 |
| CN | 109758124 A | 5/2019 |
| CN | 109846492 A | 6/2019 |
| CN | 110870769 A | 3/2020 |
| CN | 213406028 U | 6/2021 |
| CN | 113229831 A | 8/2021 |
| CN | 113576476 A | 11/2021 |
| CN | 114403904 A | 4/2022 |
| JP | 2013119001 A | 6/2013 |

OTHER PUBLICATIONS

Yoshitake Y, Ue H, Miyazaki M, Moritani T. Assessment of lower-back muscle fatigue using electromyography, mechanomyography, and near-infrared spectroscopy. Eur J Appl Physiol. Mar. 2001;84(3):174-9. doi: 10.1007/s004210170001. PMID: 11320632. (Year: 2001).*
Scano, A., et al. "Sustained Fatigue Assessment during Isometric Exercises with Time-Domain near Infrared Spectroscopy and Surface Electromyography Signals." Biomedical Optics Express, vol. 11, No. 12, Dec. 1, 2020, pp. 7357-7375, www.ncbi.nlm.nih.gov/pmc/articles/PMC7747893/, https://doi.org/10.1364/ (Year: 2020).*
Weichao Guo, et al., "A Wireless Wearable sEMG and NIRS Acquisition System for an Enhanced Human-computer Interface", 2014 IEEE International Conference on Systems, Man, and Cybernetics, Oct. 5, 2014, pp. 2192-2197.
Supplementary European Search Report cited in European Patent Application No. 22822256.8, mailed Dec. 18, 2023, 5 pages.
Second Office Action received in corresponding European Patent Application No. 22822256.8, dated Sep. 18, 2024, 4 pages.
Lloyd, A., et al., "The interactive effect of cooling and hypoxia on forearm fatigue development", European Journal of Applied Physiology, 2015, 115: 2007-2018.
Summons to attend Oral Proceedings received in corresponding European patent application No. 22822256.8, dated Apr. 2, 2025, 6 pages.

* cited by examiner

DEVICE FOR DETERMINING MUSCLE STATE BASED ON ELECTROMYOGRAPHY SIGNAL AND MUSCLE OXYGEN SATURATION

CROSS-REFERENCE TO RELATED APPLICATION

The present application is a continuation of PCT application No. PCT/CN2022/096641, filed on Jun. 1, 2022, which claims the priority benefit of China patent application No. 202111667416.5, filed on Dec. 31, 2021. The entireties of PCT application No. PCT/CN2022/096641 and China patent application No. 202111667416.5 are incorporated herein by reference and made a part of this specification.

TECHNICAL FIELD

Embodiments of the present disclosure generally relate to a field of data measurement, in particularly, relate to a device for determining muscle state based on electromyography (electromyography) signal and muscle oxygen saturation.

BACKGROUND ART

Currently, a muscle state is detected usually based on a task or a complex movement. For example, an athlete is required to do a designated high intensity movement by using a special device, so as to measure muscle power. However, the special device is usually large and not portable. In a sport rehabilitation, if a patient is in a recovery period, in order to prevent a sports injury, it is not suggested to do the high intensity movement. Thus, a detection of the muscle state is limited greatly.

Additionally, for most of current technologies, only a blood oxygen is collected from a certain muscle group separately, and an electromyography (electromyography) signal of this part is not collected. Thus the muscle state is analyzed and determined only based on a blood oxygen content. Actually, the muscle state can be detected in many dimensions, such as electrical signal and oxygen content. For example, when the muscle is tired, an electrical signal area is flat, but the blood oxygen content may be high.

SUMMARY

The embodiments of the present disclosure provides a solution for determining muscle state based on electromyography (electromyography) signal and muscle oxygen saturation.

The present disclosure provides a device for determining muscle state based on electromyography signal and muscle oxygen saturation, including:
a signal collection module, configured for collecting a human electromyography signal data;
a light source detection module, configured for emitting light with different wavelengths;
a photosensitive receiver module, configured for receiving light reflected by skin after the light emitted by the light source detection module irradiates skin;
a blood oxygen calculation module, configured for calculating the muscle oxygen saturation based on the light received by the photosensitive receiver module; and
a data statistics module, configured for determining the muscle state based on the human electromyography signal data and the muscle oxygen saturation.

The device for determining muscle state based on electromyography signal and muscle oxygen saturation provided in the embodiments of the present application: collects the human electromyography signal data by using the signal collection module; emits the light with different wavelengths by using the light source detection module; receives the light reflected by skin after the light emitted by the light source detection module irradiates the skin by using the photosensitive receiver module; calculates the muscle oxygen saturation based on the light received by the photosensitive receiver module by using the blood oxygen calculation module; and determines the muscle state based on the human electromyography signal data and the muscle oxygen saturation by using the data statistics module. Thus, an accurate detection of the muscle state is realized.

It should be understood that, contents described in the summary is not intended to limit key or important features of the embodiments in the present disclosure, nor to limit a scope of the present disclosure. Other features of the present disclosure will be easily understood by the following description.

BRIEF DESCRIPTION OF THE DRAWINGS

In combination with drawings and referring to the following detailed description, the above and other features, advantages and aspects of the embodiments in the present disclosure will be more apparent. In the drawings, the same or similar reference signs indicate the same or similar elements, in which.

DETAILED DESCRIPTION

In order to make a purpose, a technical solution and an advantage of the embodiments in the present disclosure clearer, the technical solution of the embodiments in the present disclosure is illustrated clearly and completely in combination with drawings of the embodiments in the present disclosure below. Based on the embodiments in the present disclosure, all of other embodiments obtained by those skilled in the art without doing creative work fall in a protection scope of the present disclosure.

In addition, a term "and/or" herein is only a kind of association relationship describing association objects, and indicates that there can be three types of relationships. For example, A and/or B can indicate the following three situations: A exists alone, A and B exist at the same time, and B exists alone. In addition, a character "/" herein generally indicates that associated objects are in an "or" relationship.

Figure 1:
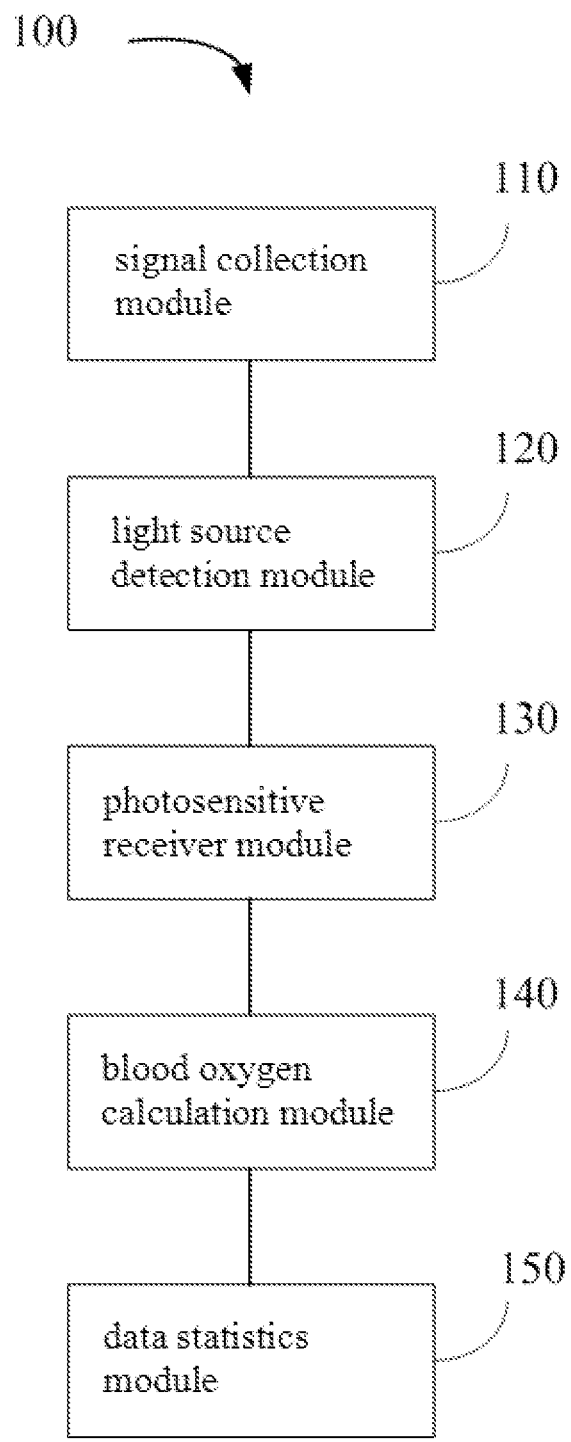
FIG. 1 is a block diagram of a device for determining muscle state based on electromyography signal and muscle oxygen saturation in the embodiments of the present disclosure.
Figure 2:
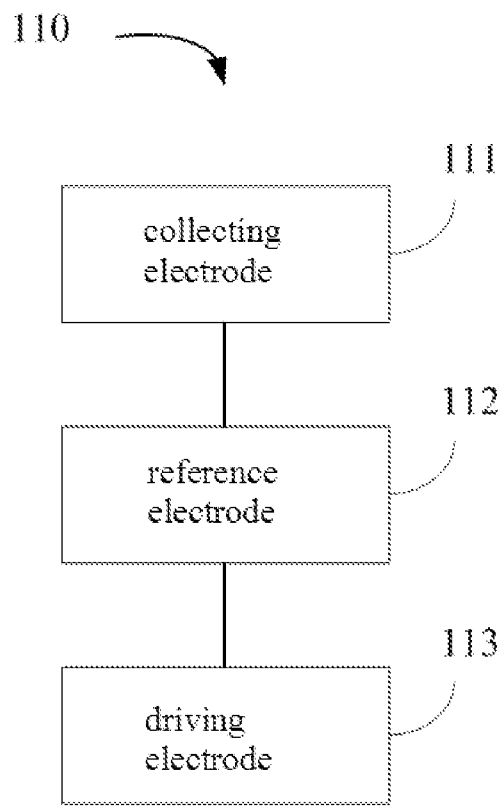
FIG. 2 is a structural frame diagram of a signal collection module in the embodiments of the present disclosure.
Figure 3:
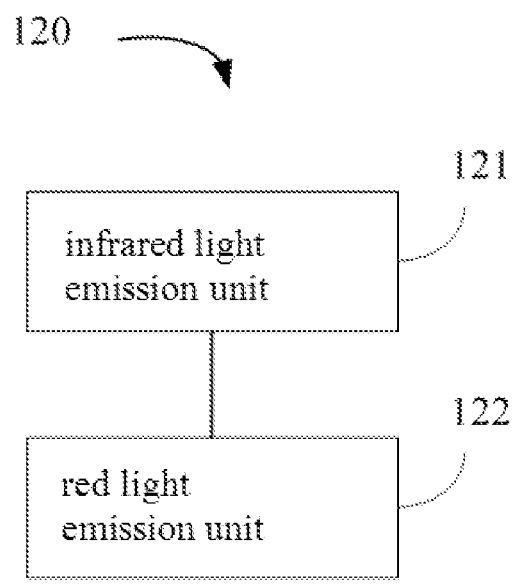
FIG. 3 is a structural frame diagram of a light source detection module in the embodiments of the present disclosure.

FIG. 1 is a block diagram of a device 100 for determining muscle state based on electromyography (electromyography) signal and muscle oxygen saturation in the embodiments of the present disclosure. As shown in FIG. 1, the device 100 includes:
- a signal collection module 110, configured for collecting a human electromyography signal data;
- a light source detection module 120, configured for emitting light with different wavelengths;
- a photosensitive receiver module 130, configured for receiving light reflected by skin after the light emitted by the light source detection module irradiates skin;
- a blood oxygen calculation module 140, configured for calculating the muscle oxygen saturation based on the light received by the photosensitive receiver module; and
- a data statistics module 150, configured for determining the muscle state based on the human electromyography signal data and the muscle oxygen saturation.

In some embodiments, the signal collection module 110 includes a collecting electrode 111, a reference electrode 112 and a driving electrode 113.

By using the collecting electrode 111, the reference electrode 112 and the driving electrode 113, after collecting the human electromyography signal, the human electromyography signal is successively input to a signal follower 501, an amplifying and filtering circuit 502 and an analog-to-digital converter (ADC) circuit 503.

An output data is collected by using a MCU, and then the data is processed to obtain a human electromyography signal data.

In which, a collecting rate for collecting the electromyography signal is no less than 4096 Hz.

In some embodiments, the light source detection module 120 includes multiple infrared light emission units 121 and red light emission units 122 with different wavelengths, and is configured for detecting different skin tones (different wavelengths) and different muscle tissues.

In which, a wavelength range of the infrared light emission unit 121 and the red light emission unit 122 is 600 nm-950 nm.

In some embodiments, the device may include one or more photosensitive receiver modules 130. A received wavelength sensitivity range of each of the photosensitive receiver modules 130 is set up according to the wavelength range of the infrared light emission unit 121 and the red light emission unit 122. Generally, the photosensitive receiver module 130 corresponds to the light source detection module 120. For example, the blood oxygen is measured by using two light sources with wavelength of 660 nm-700 nm and 900 nm-910 nm respectively, thus a photosensitive receiver (photosensitive receiver module 130) has a wavelength sensitivity between 600 nm and 1000 nm.

In an actual measurement, a detection depth is determined by a distance between the signal collection module 110 and the light source detection module 120. In the present disclosure, multiple distance parameters is set up to collect blood oxygen or muscle oxygen. Generally, the distance between the signal collection module 110 and the light source detection module 120 is between 8 mm and 30 mm.

In some embodiments, the blood oxygen calculation module 140 converts a light intensity of the light received by the photosensitive receiver module 130 to a current signal, and inputs the current signal to a transimpedance amplifier 601 to obtain a voltage signal, and calculates the muscle oxygen content based on the voltage signal and a ratio of a red light intensity to an infrared light intensity. That is, based on the light received by the photosensitive receiver module 130, the muscle oxygen saturation is calculated by the following formula.

A calculation formula of the blood oxygen: a ratio of a volume of oxyhemoglobin ($HbO_2$) in a blood to a volume of all hemoglobin (Hb) which can be combined, that is, a ratio of $HbO_2$ concentration to $HbO2+Hb$ concentration.

Specifically, the blood oxygen is measured by using two light sources with wavelength of 660 nm-770 nm and 900 nm-910 nm respectively, and the wavelength sensitivity of the photosensitive receiver (photosensitive receiver module 130) is between 600 nm and 1000 nm.

1. Baseline measurement: determining a wavelength sensitivity of the photosensitive receiver module 130.

Via a baseline measurement instruction, testing and combining the light sources and the photosensitive receiver module 130 at different distances in each group by using a sensor. Obtaining a best ratio of the light sources and the receiver in one group by controlling on and off with MCU. That is, determining an optimal distance of the photosensitive receiver module 130 is determined.

2. Ambient light measurement: determining a threshold of the ambient light, and taking out an environmental component in a later filtering to reduce a noise. Starting the ambient light measurement without turning on the light source, and only turning on the photosensitive receiver to detect an environment, so as to obtain an average value of a final DC component, and using the average value as a reference value for filtering the ambient light.

3. Formal measurement. After starting measurement, tuning on the two light sources (infrared light and red light) at different times with MCU, and the turning on rate can be configured. The photosensitive receiver module 130 collects the data of the two light sources, and the blood oxygen calculation module 140 calculates a blood oxygen value and obtains a blood oxygen data by utilizing a character that the absorption spectra of the hemoglobin for the infrared light and the red light under different oxygenation states is different.

It should be noted that, steps for calculating the blood oxygen value are basically the same as steps for calculating a muscle oxygen value, but the light source used for measurement is different. The steps for calculating the blood oxygen value can be referred to calculate the muscle oxygen value.

In which, when calculating the muscle oxygen value, the light source detection module 120 uses two light sources with wavelength of 700 nm-760 nm and 800 nm-850 nm respectively (near-infrared light source), and the wavelength sensitivity of the photosensitive receiver module 130 is between 700 nm-1100 nm.

In some embodiments, the data statistics module 150 is configured for determining the muscle state based on the human electromyography signal data and the muscle oxygen saturation.

Specifically, time domain analyzing the human electromyography signal data, the muscle oxygen value and the blood oxygen value, so as to obtain a characteristic parameter of the muscle oxygen and determine a standard deviation of the muscle oxygen.

Based on a fluctuation degree of the standard deviation of the muscle oxygen, determining the muscle state (fatigue degree).

It should be noted that, the device for determining muscle state based on electromyography (electromyography) signal and muscle oxygen saturation in the present disclosure further can be provided with a skin temperature test module and an acceleration sensor according to different application situations, so as to more accurately detect the muscle state of the an user.

The embodiments of the present disclosure have the following technical effects.

The device of the present disclosure not only collects a muscle oxygen signal, but also collects an electromyography blood oxygen signal (and a skin temperature signal) at the same time. In addition, the sensor collects the muscle tissues in a same area, and a blood oxygen collection, a muscle oxygen collection and an electromyography collection (and skin temperature collection) are integrated together. The collection of the above modules are not independent. The sensors on the market for measuring the above indicators are independent sensors, and they measure the muscle tissues in different areas.

The light sources with different wavelengths and the photosensitive receivers with different sensitivities are used to adapt to the collection of most situations. In addition, the light sources with different wavelengths can be switched automatically or manually. Meanwhile, in order to detect a deeper depth under the skin, the distance between the light source detection module 120 and the photosensitive receiver module 130 in the present disclosure is variable (changing between 8 mm and 30 mm).

It should be noted that, for the above embodiments, in order to describe simply, they are all described as a series of action combinations. However, those skilled in the art should know that, the present disclosure is not limited by an order of described actions. Because according to the present disclosure, some steps can be performed in other orders or at the same time. Additionally, those skilled in the art should also know that the embodiments described in the specification are optional embodiments, and the actions and modules involved may be not necessary for the present disclosure.

Figure 4:
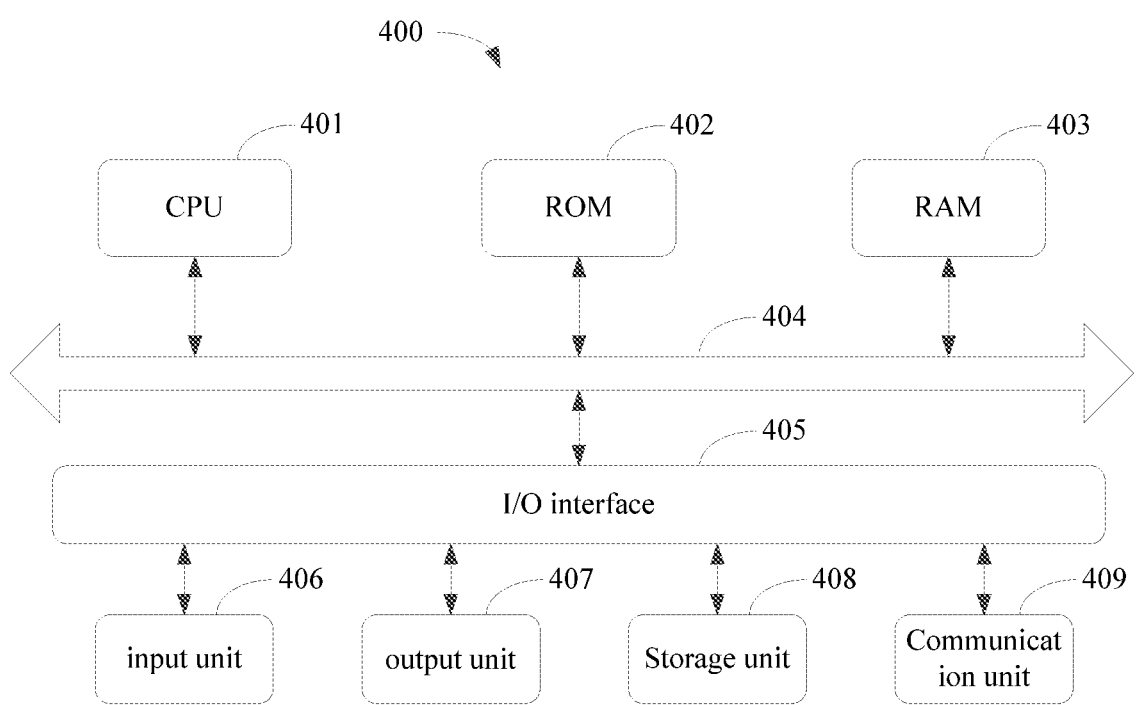
FIG. 4 is a block diagram of an exemplary electronic device which can be used to implement the embodiments of the present disclosure.
Figure 5:
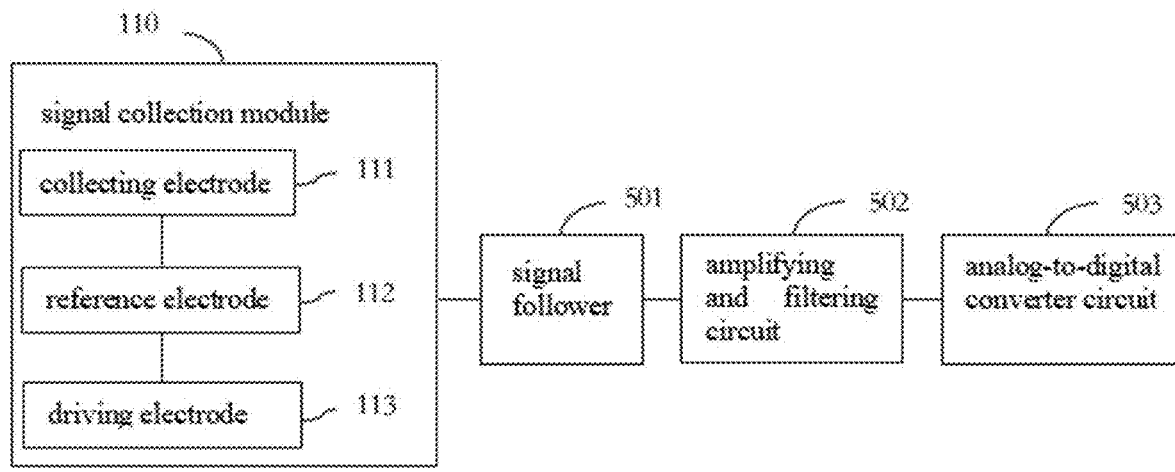
FIG. 5 is a structural frame diagram of the signal collection module obtaining human electromyographic signals in the embodiments of the present disclosure.
Figure 6:
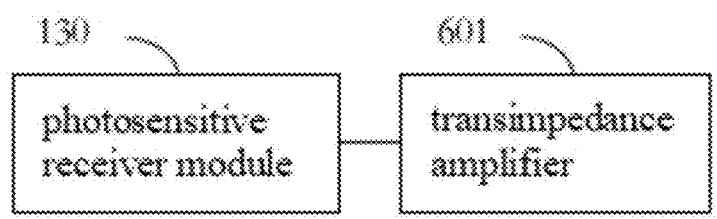
FIG. 6 is a structural frame diagram of a photosensitive receiver module and a transimpedance amplifier in the embodiments of the present disclosure.

FIG. 4 is a block diagram of an exemplary electronic device which can be used to implement the embodiments of the present disclosure. As shown in figures, the device 400 includes a central processing unit (CPU) 401, which can execute various appropriate actions and process according to a computer program instruction stored in a read only memory (ROM) 402 or loaded into a random access memory (RAM) 403 from a storage unit 408. The RAM 403 also can store various programs and data required for device 400 operation. The CPU 401, the ROM 402 and the RAM 403 can be connected with each other by using a main wire 404. An input/output (I/O) interface 405 is also connected to the main wire 404.

Multiple components in the device 400 are connected to the I/O interface 405, including: an input unit 406, such as a keyboard, a mouse and etc.; an output unit 407, such as various types of monitors, speakers and etc.; the storage unit 408, such as a disk, an optical disk and etc.; and a communication unit 409, such as a network card, a modem, a wireless communication transceiver and etc. The communication unit 409 allows the device 400 to exchange information/data with other devices by a computer network such as internet and/or various telecommunication networks.

In some embodiments, when the computer program is loaded in the RAM 403 and executed by the CPU 401, part or all of a computer program can be loaded and/or installed on the device 400 via the ROM 402 and/or the communication unit 409.

Functions described above herein can be performed at least partially by one or more hardware logical components. For example, exemplary types of the hardware logic components that can be used include: a field programmable gate array (FPGA), application specific integrated circuit (ASIC), application specific standard product (ASSP), system on a chip (SOC), complex programmable logic device (CPLD) and etc.

Program codes for implementing methods of the present disclosure can be written in any combinations of one or more programming languages. These program codes can be provided to a general computer, a special computer, or a processor or a controller of other programmable data processing devices, so that when the program codes are executed by the processor or a controller, the functions/operations specified in flowchart and/or block diagram are implemented. The program codes can be executed in the device completely or partially, and as an independent software package, executed in a machine partially and in a remote machine partially, or in the remote machine or a server completely.

In a context of the present disclosure, a machine readable medium can be a tangible medium, which can contain or store programs for use by, or use in combination with an instruction executing system, machine or device. The machine readable medium can be a machine readable signal medium or a machine readable storage medium. The machine readable medium includes but is not limited to electronic, magnetic, optical, electromagnetic, infrared, or semiconductor system, machine or device, or any appropriate combinations of the above. A more specific example of the machine readable storage medium includes an electrical connection based on one or more lines, a portable computer disk, a hard disk, the random access memory (RAM), the read only memory (ROM), an erasable programmable read only memory (EPROM or flash EPROM), an optical fiber, a portable compact disk read only memory (CD-ROM), an optical storage device, a magnetic storage device, or any appropriate combinations of the above.

Additionally, although the operations are described in the specific order, this should be understood as requiring that such operations are performed in the shown specific order or a sequential order, or requiring that all operations shown in figures are performed to obtain a desired result. Under certain situations, multitasking and parallel processing may be beneficial. Similarly, although the above discussion includes several specific implementation details, these should not be understood as limiting the scope of the present disclosure. Some features described in the context of the separate embodiment can also be implemented in combination with each other in one embodiment. By contrary, various features described in the context of one embodiment can also be implemented in multiple embodiments separately or in any appropriate sub combinations.

Although the subject matter has been described by using language specific to the structural features and/or the method logic actions, it should be understood that the subject matter defined in the claims is not necessarily limited to the specific features or actions described above. By contrary, the specific features and actions described above are only examples for realizing the claims.

What is claimed is:

1. A device for determining muscle state based on an electromyography signal and a muscle oxygen saturation, comprising:
   a signal collection module, configured for collecting human electromyography signal data;
   a plurality of light source detection modules, each configured for emitting light with different wavelengths, wherein the plurality of light source detection modules comprise a plurality of infrared light emission units and a plurality of red light emission units;

a plurality of photosensitive receiver modules, configured for receiving light reflected by skin after the light emitted by the plurality of light source detection modules irradiates the skin, wherein a sensitive range of a receiving wavelength of each of the plurality of photosensitive receiver modules is set according to a wavelength range of each of the plurality of infrared light emission units and the plurality of red light emission units, a distance between the plurality of light source detection modules and the plurality of photosensitive receiver modules is variable, an optimal distance of each of the plurality of photosensitive receiver modules is determined by setting multiple distance parameters, and different light source detection modules of the plurality of light source detection modules and different photosensitive receiver modules of the plurality of photosensitive receiver modules are turned on to measure blood oxygen and muscle oxygen;

a blood oxygen calculation module, configured for calculating a muscle oxygen saturation based on the light received by the plurality of photosensitive receiver modules, wherein the blood oxygen calculation module is further configured to:
  convert a light intensity of the light received by the plurality of photosensitive receiver modules to a current signal;
  input the current signal to a transimpedance amplifier to obtain a voltage signal; and
  calculate a muscle oxygen content based on the voltage signal and a ratio of a red light intensity to an infrared light intensity,
  wherein the muscle oxygen saturation comprises muscle oxygen values and blood oxygen values; and a data statistics module, configured for determining a muscle state based on the human electromyography signal data and the muscle oxygen saturation.

2. The device according to claim 1, wherein the signal collection module comprises a collecting electrode, a reference electrode and a driving electrode.

3. The device according to claim 2, wherein the signal collection module is further configured to:
  obtain human electromyography signals by using the collecting electrode, the reference electrode and the driving electrode;
  successively input the human electromyography signals to a signal follower, an amplifying and filtering circuit, and an analog-to-digital converter (ADC) circuit; and
  obtain the human electromyography signal data by collecting output data with a microcontroller unit (MCU).

4. The device according to claim 3, wherein a collecting rate for collecting the human electromyography signals is not less than 4096 Hz.

5. The device according to claim 1, wherein the wavelength range of each of the plurality of infrared light emission units and the plurality of red light emission units is 600 nm-950 nm.

* * * * *